US008334792B2

(12) United States Patent
Kim

(10) Patent No.: US 8,334,792 B2
(45) Date of Patent: Dec. 18, 2012

(54) PARKING PLACE CONFIRMATION SYSTEM AND METHOD THEREOF

(75) Inventor: Tae Ho Kim, Yongin-si (KR)

(73) Assignee: Samsung SDS Co., Ltd., Seoul (KR)

( * ) Notice: Subject to any disclaimer, the term of this patent is extended or adjusted under 35 U.S.C. 154(b) by 728 days.

(21) Appl. No.: 12/514,713

(22) PCT Filed: Apr. 11, 2007

(86) PCT No.: PCT/KR2007/001755
§ 371 (c)(1), (2), (4) Date: Oct. 21, 2009

(87) PCT Pub. No.: WO2008/060016
PCT Pub. Date: May 22, 2008

(65) Prior Publication Data

US 2010/0085214 A1 Apr. 8, 2010

(30) Foreign Application Priority Data

Nov. 13, 2006 (KR) ........................ 10-2006-0111611

(51) Int. Cl.
*B60Q 1/48* (2006.01)
*G08G 1/14* (2006.01)

(52) U.S. Cl. ...................... 340/932.2; 340/933; 340/988

(58) Field of Classification Search .................. 340/933, 340/988, 989, 8.1, 932.2
See application file for complete search history.

(56) References Cited

U.S. PATENT DOCUMENTS

| | | | |
|---|---|---|---|
| 7,026,954 | B2 | 4/2006 | Slemmer et al. |
| 2006/0227010 | A1 | 10/2006 | Berstis et al. |

FOREIGN PATENT DOCUMENTS

| | | | |
|---|---|---|---|
| JP | 2004-192513 | A | 7/2004 |
| KR | 10-2006-0018905 | A | 3/2006 |
| KR | 10-2006-0027105 | A | 3/2006 |
| KR | 10-2006-0057150 | A | 5/2006 |

*Primary Examiner* — Daniel Wu
*Assistant Examiner* — Frederick Ott
(74) *Attorney, Agent, or Firm* — The Webb Law Firm

(57) ABSTRACT

Disclosed is a system and method for checking a parking position that enables a parking lot user to conveniently check a position of a vehicle that he/she has parked using his/her mobile communication terminal. When a customer with a mobile communication terminal having a built-in Radio Frequency IDentification (RFID) reader chip moves his/her vehicle close to an RFID tag for checking a parking position installed at a parking stall, the position information regarding the parking stall stored in the RFID tag is transmitted to a parking management server, and the parking management server transmits it again to the mobile communication terminal in text or graphic format.

20 Claims, 4 Drawing Sheets

CROSS-SECTIONAL VIEW TAKEN ALONG A-A'

PARKING PLACE CONFIRMATION SYSTEM AND METHOD THEREOF

TECHNICAL FIELD

The present invention relates to a system for checking a parking position, and more particularly, to a system and method for checking a parking position that enable a parking lot user to conveniently check a position of a vehicle that he/she has parked using his/her mobile communication terminal.

BACKGROUND ART

In general, automatic control and a parking-fee settlement method at a parking lot entrance are main concerns in a conventional parking management system. Recently, in order to run a parking lot entrance without a person and automate it, a method has been developed which performs management centered on parking-fee settlement using a parking-pass dispensing machine or a number-plate image recognition machine and radio frequency (RF) communication (limited to vehicles of regular parking members), installs a vehicle detection device for recognizing occupation of parking stalls in parking sections to show an available parking section at the entrance, and thus can recognize available parking capacity and available parking positions.

In addition, an apparatus that is installed in a passage in a building and pre-settles a parking fee has been developed and is being partially used for the sake of quick drive-out exit, but in most cases a parking manager calculates a parking fee in person.

The above-mentioned conventional methods check and provide the positions and number of available parking stalls as well as a parking time period and the parking fee at the entrance, thus actually centering on fee settlement and parking capacity check. Therefore, the conventional methods can be considered as systems for a parking lot manager rather than for a vehicle driver.

Since a vehicle detection device must be installed in each parking stall to check available parking capacity, the methods necessitate excessive cost. In addition, the methods sense whether or not a vehicle exists only in a parking stall, and thus cannot ensure sensing reliability when a parking stall sensor malfunctions or is in an abnormal state. Therefore, when a driver drives to a designated parking stall, cases frequently happen where he/she has to drive to another parking stall because another vehicle has already been parked in the parking stall.

Furthermore, a driver may urgently park his/her vehicle in a parking lot of a building, leave to take care of business, and return to the parking lot to drive-out exit his/her vehicle. In this case, the driver may neither remember the parking position exactly, i.e., a floor number and a section, nor find his/her vehicle with ease.

Korean Laid-Open Patent Publication No. 2006-0018905 Parking Place Confirmation System, which is a preceding document, suggests a system for checking a parking position. According to the system, when an ultrasonic sensor installed for checking whether or not a vehicle is parked transfers information on the same to a controller, previously recorded speech is output through a voice module having a built-in speaker after a predetermined time period. Thus, a driver who has got out of his/her vehicle can hear the speech and recognize the parking position of the vehicle.

However, according to the preceding document, when a driver parks his/her vehicle, the system checks whether or not the vehicle is parked using an ultrasonic sensor and after a predetermined time period, informs the driver the parking position using a speaker at the time the driver gets out of his/her vehicle door. Thus, the driver has to remember the parking position even after a considerable time period. In addition, when several vehicles enter parking cells at a time, it is difficult to check exits of drivers according to the technology suggested in the preceding document, thus remarkably deteriorating accuracy.

DISCLOSURE OF INVENTION

Technical Problem

The present invention is directed to a system and method for checking a parking position which enable a parking lot user to easily check the position of a vehicle that he/she has parked using his/her mobile communication terminal.

Technical Solution

One aspect of the present invention provides a system for checking a parking position, comprising: a first Radio Frequency IDentification (RFID) tag attached to one side of a vehicle and storing vehicle information; an RFID reader installed at an entrance of a parking lot and having an antenna to read the vehicle information stored in the first RFID tag; second RFID tags attached close to parking stalls to respectively correspond to the parking stalls and storing position information regarding the corresponding parking stalls; a mobile communication terminal having an RFID reader chip to read position information regarding a parking stall stored in a second RFID tag and transmitting the read position information regarding the parking stall together with the mobile communication terminal s phone number to a parking management server described below via a wireless network; and the parking management server receiving the read vehicle information from the RFID reader, comparing it with previously stored customer vehicle information, determining whether or not to permit the vehicle to enter the parking lot, receiving the phone number and the read position information regarding the parking stall from the mobile communication terminal, matching them with the vehicle information regarding a customer corresponding to the phone number, storing and managing the matched phone number and the matched position information, and transmitting the position information regarding the current parking stall for the customer s vehicle to the customer s mobile communication terminal via the wireless network.

Here, the parking management server may transmit the position information regarding the current parking stall to the customer s mobile communication terminal in text or graphic data.

The system may further comprise a display installed at the entrance of the parking lot and visually displaying whether or not a vehicle exists in each parking stall managed by the parking management server.

The parking management server may receive the read vehicle information from the RFID reader, compare it with the previously stored customer vehicle information, determine whether or not to permit the vehicle to enter the parking lot, and then when the vehicle is permitted to enter the parking lot, refer to a previously stored history of the customer s parking position, and control the display to display a parking stall suitable for the customer s preference.

The system may further comprise notification generators respectively installed close to the second RFID tags and imparting a data communication state between the parking management server and the mobile communication terminal, and when the phone number and read position information regarding the parking stall are received from the mobile communication terminal, the parking management server may control a notification generator installed at the parking stall to operate.

The notification generators may be implemented by lamps or speakers to visually or auditorily impart position information regarding corresponding parking stalls to customers.

The system may further comprise a parking-position notification device interworking with the parking management server, installed at the entrance of the parking lot, and imparting the position information regarding the current parking stall for the customer s vehicle according to the customer s request.

The parking-position notification device may be implemented by one of a light emitting diode (LED) panel, a liquid crystal display (LCD), a plasma display panel (PDP), or a speaker to visually or auditorily impart the position information regarding the current parking stall to the customer.

The parking-position notification device may further comprise a third RFID tag to communicate with the RFID reader chip in the mobile communication terminal, the mobile communication terminal may read tag information stored in the third tag and transmit it together with the mobile communication terminal s own phone number to the parking management server via the wireless network, and the parking management server may receive the phone number and the read tag information from the mobile communication terminal and transmit the position information regarding the current parking stall for the customer s vehicle, corresponding to the phone number, to the parking-position notification device.

The parking-position notification device may further comprise a key input unit having a plurality of character and numeric keys and transmit a key input signal received from the key input unit to the parking management server, and the parking management server may transmit the position information regarding the current parking stall for the customer s vehicle corresponding to the key input signal to the parking-position notification device.

Another aspect of the present invention provides a method of checking a parking position using a system comprising a first Radio Frequency Identification (RFID) tag attached to one side of a vehicle and storing vehicle information, an RFID reader installed at an entrance of a parking lot, second RFID tags storing position information regarding each parking stall, a mobile communication terminal having a built-in RFID reader chip, and a parking management server managing overall parking situations in the parking lot, the method comprising the steps of: (a) reading, at the RFID reader, the vehicle information regarding the first RFID tag drawn close to the RFID reader and transmitting it to the parking management server; (b) receiving, at the parking management server, the vehicle information from the RFID reader, comparing it with previously stored customer vehicle information, and determining whether or not to permit the vehicle to enter the parking lot; (c) reading, at the RFID reader chip of the mobile communication terminal, position information regarding a parking stall stored in a second RFID tag and transmitting it together with the mobile communication terminal s phone number to the parking management server; and (d) transmitting, at the parking management server, the position information regarding the current parking stall for the vehicle of the corresponding customer to the customer s mobile communication terminal.

Here, after step (b), the method may further comprise the step of, when the vehicle is permitted to enter the parking lot, referring, at the parking management server, to a previously stored history of the customer s parking position, and displaying a position of a parking stall suitable for the customer s preference on a display disposed at the entrance of the parking lot.

In step (c), when data communication is performed normally between the parking management server and the mobile communication terminal, the parking management server may operate a notification generator installed close to the second RFID tag to impart the position information regarding the current parking stall to the customer.

Step (d) may further comprise the step of matching, at the parking management server, the phone number and the position information regarding the parking stall transmitted from the mobile communication terminal with the vehicle information regarding the customer, corresponding to the phone number, and storing and managing them.

In step (d), the parking management server may transmit the position information regarding the current parking stall to the customer s mobile communication terminal in text or graphic data.

Still another aspect of the present invention provides a recording media storing a program for executing the above-described method of checking a parking position.

ADVANTAGEOUS EFFECTS

According to the inventive system and method for checking a parking position, when a customer with a mobile communication terminal having a built-in Radio Frequency Identification (RFID) reader chip moves his/her vehicle close to an RFID tag for checking a parking position installed at a parking stall, the position information regarding the parking stall stored in the RFID tag for checking a parking position is transmitted to a parking management server, and the parking management server transmits it again to the mobile communication terminal in text or graphic format. Therefore, the customer can easily know the parking position of his/her own vehicle using his/her mobile communication terminal at any time. In addition, the parking management server checks the vacancy rate of the parking lot, thereby imparting information regarding the number of currently parked vehicles and available parking stalls on each floor to a vehicle entering the parking lot, and also letting the vehicle move to a currently available parking stall.

In addition, according to the present invention, it is possible to reduce time taken for a parking lot user to search for an available parking stall, reduce oil consumption, and minimize air pollution caused by gas exhaust.

MODE FOR THE INVENTION

Hereinafter, exemplary embodiments of the present invention will be described in detail. However, the present invention is not limited to the exemplary embodiments disclosed below and can be implemented in various modified forms. The present exemplary embodiments are provided to enable one of ordinary skill in the art to embody and practice the invention.

Figure 1:
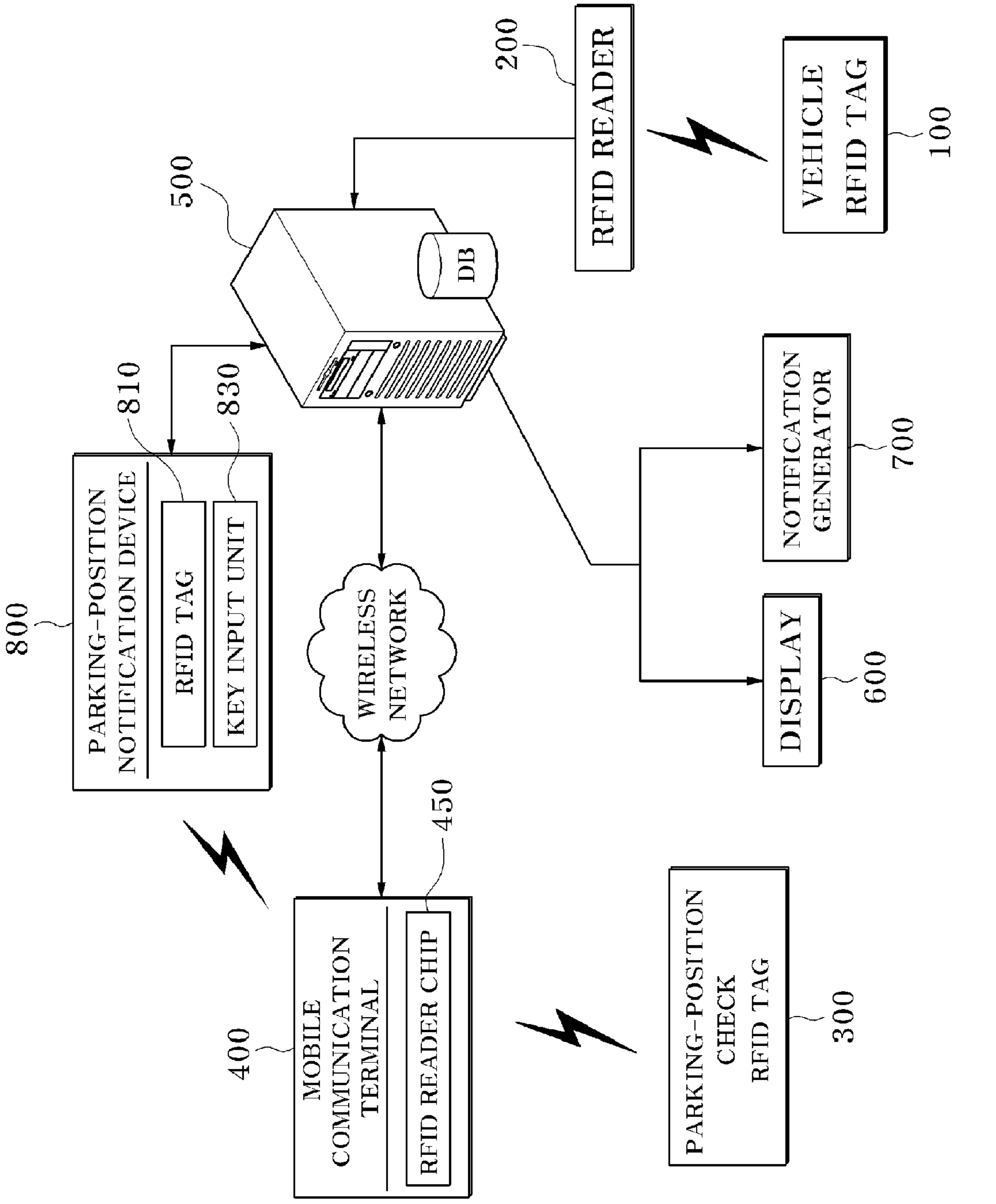
FIG. 1 is a schematic block diagram of an entire system for checking a parking position according to an exemplary embodiment of the present invention.
Figure 2:
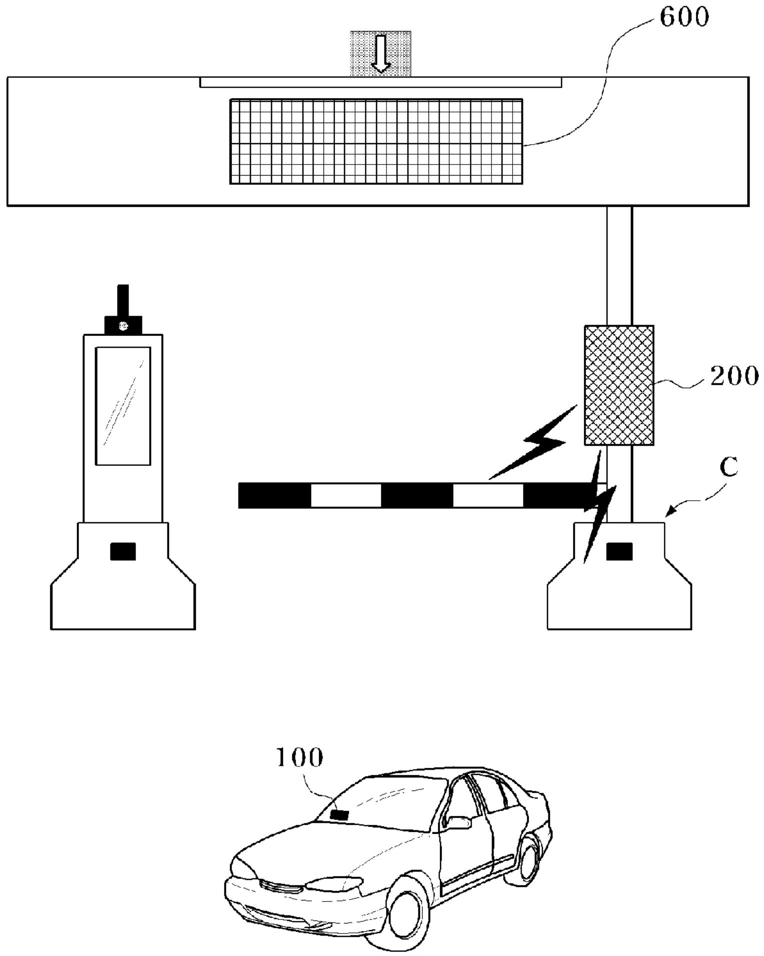
FIG. 2 illustrates installation positions of a Radio Frequency IDentification (RFID) tag for a vehicle, an RFID reader, and a display applied to an exemplary embodiment of the present invention.
Figure 3:
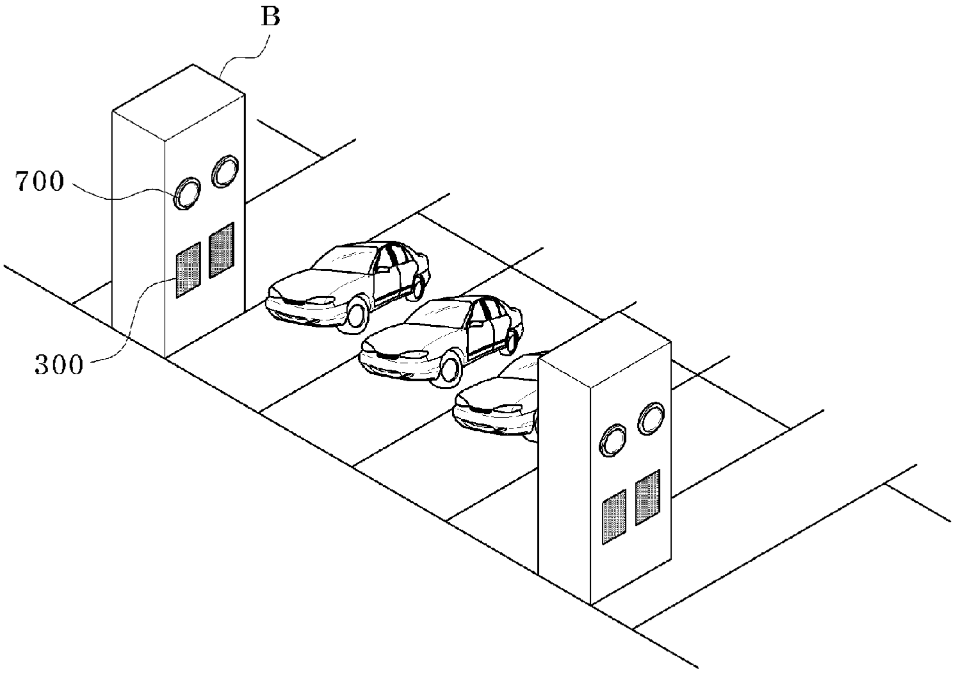
FIG. 3 illustrates installation positions of RFID tags for checking a parking position applied to an exemplary embodiment of the present invention.
Figure 4:
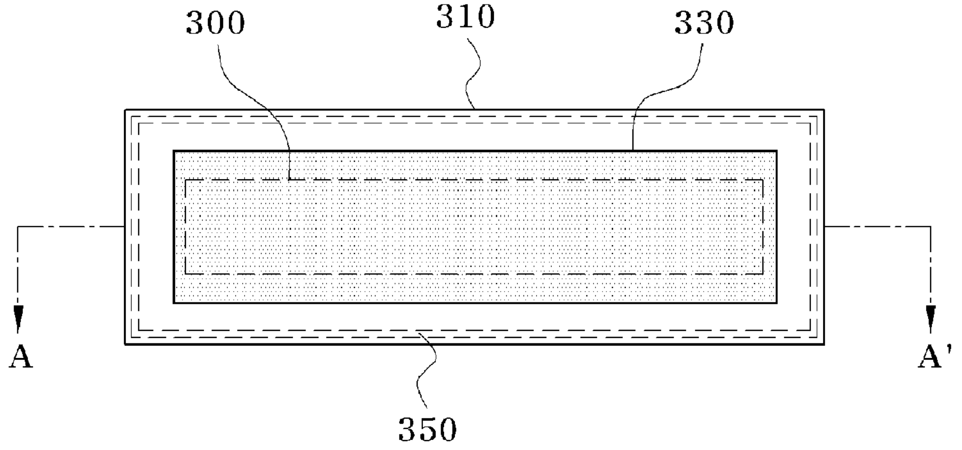
FIG. 4 is a plan view and a cross-sectional view of an RFID tag for checking a parking position applied to an exemplary embodiment of the present invention.
Figure 4:
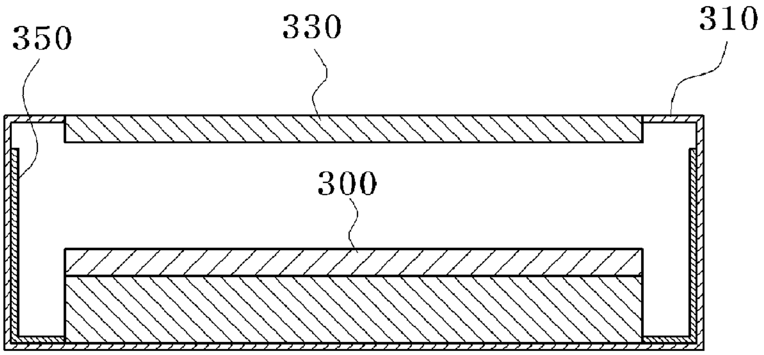

FIG. 1 is a schematic block diagram of an entire system for checking a parking position according to an exemplary embodiment of the present invention. FIG. 2 illustrates installation positions of a Radio Frequency IDentification (RFID) tag for a vehicle, an RFID reader, and a display applied to an exemplary embodiment of the present invention. FIG. 3 illustrates installation positions of RFID tags for checking a parking position applied to an exemplary embodiment of the present invention. FIG. 4 is a plan view and a cross-sectional view of an RFID tag for checking a parking position applied to an exemplary embodiment of the present invention.

Referring to FIGS. 1 to 4, the system for checking a parking position according to an exemplary embodiment of the present invention may comprise a vehicle RFID tag 100, an RFID reader 200, RFID tags 300 for checking a parking position, a mobile communication terminal 400 and a parking management server 500.

Here, the vehicle RFID tag 100 may be attached to one side of a vehicle with common adhesive tape, etc., and stores a variety of information, e.g., a vehicle number, driver information, etc. of the corresponding vehicle.

A manager of a parking lot is provided with the variety of vehicle information from a user and inputs it in the vehicle RFID tag 100 according to the user s request. The vehicle RFID tag 100 has previously been issued to the user, and the variety of vehicle information provided by users is stored according to the respective users in a database DB included in the parking management server 500.

The RFID reader 200 is installed at the entrance of the parking lot, and functions to read and transfer vehicle information stored in the vehicle RFID tag 100 to the parking management server 500.

The RFID reader 200 has a predetermined antenna to read vehicle information stored in the vehicle RFID tag 100 when a vehicle to which the vehicle RFID tag 100 is attached comes within a communicable range.

In addition, the antenna of the RFID reader 200 may be installed at, for example, a parking gate C that controls entry and exit of vehicles, as illustrated in FIG. 2. However, the antenna s position is not limited thereto, and the antenna may be separately installed near the entrance of the parking lot.

Meanwhile, as illustrated in FIG. 2, the vehicle RFID tag 100 may be attached to a position where a line of sight to the antenna of the RFID reader 200 can easily be attained, i.e., the windshield of a vehicle.

The parking-position check RFID tags 300 are attached close to parking stalls in the parking lot to correspond to the parking stalls, respectively. Each of the parking-position check RFID tags 300 stores a variety of information, e.g., the position of the corresponding parking stall, information on a communication code with the parking management server 500 for checking the position of the corresponding parking stall, etc.

Here, the communication code with the parking management server 500 stored in the parking-position check RFID tags 300 indicates the unique communication code of the parking management server 500 required for the mobile communication terminal 400 to transmit the position information regarding the corresponding parking stall to the parking management server 500 via a wireless network, e.g., a Code Division Multiple Access (CDMA) network.

In addition, as illustrated in FIG. 4, the parking-position check RFID tag 300 may be installed within a housing 310 made from a material that is not easily deformed, e.g., plastic. The front side of the housing 310 may use a thin colored blocking glass 330 or a material having little effect on electric wave blocking.

In addition, a shielding paint 350 is painted on the inner side surfaces of the housing 310 to prevent data of another approaching tag from being input into the mobile communication terminal 400 due to diffused reflection.

Meanwhile, as illustrated in FIG. 3, the parking-position check RFID tag 300 may be installed in a pillar B disposed near each parking stall. However, the position of the parking-position check RFID tag 300 is not limited thereto, and it may be installed in an object disposed near the corresponding parking stall, e.g., a hump installed in front of each parking stall.

The mobile communication terminal 400 has a built-in RFID reader chip 450 to read a variety of information that is stored in the parking-position check RFID tag 300 to check the position of the corresponding parking stall. The mobile communication terminal 400 functions to transmit its own phone number together with the position information regarding the parking stall read from the parking-position check RFID tag 300 to the designated parking management server 500 via the wireless network, e.g., a CDMA network, etc.

The mobile communication terminal 400 may be any device that can be used for wireless communication while being carried by a user, such as a cellular phone, a personal digital assistant (PDA), and so on.

The parking management server 500 manages overall parking situations in the parking lot. The parking management server 500 is provided with read vehicle information data from the RFID reader 200, compares it with user vehicle information data previously stored in the database DB, determines whether or not to permit a vehicle to enter the parking lot, and then makes the parking gate C installed at the parking lot entrance operate according to the determination result.

In addition, the parking management server 500 is provided with the phone number and the read position information regarding the parking stall transmitted from the mobile communication terminal 400, matches them with vehicle information regarding the user corresponding to the phone number, and stores and manages them in the database DB.

In addition, the parking management server 500 functions to transmit the position information regarding a current parking stall for the corresponding user s vehicle to the user s mobile communication terminal 400.

Here, the parking management server 500 may transmit the position information regarding a current parking stall in text or graphic data using short message service (SMS), and so on.

In addition, as illustrated in FIG. 2, a display 600 for visually displaying whether or not a vehicle exists in each parking stall managed by the parking management server 500 may further be installed at the parking lot entrance. The display 600 may be implemented by, for example, a light emitting diode (LED) panel, a liquid crystal display (LCD), a plasma display panel (PDP), and so on.

Here, the parking management server 500 may be provided with the read vehicle information from the RFID reader 200, compare it with the user vehicle information previously stored in the database DB, determine whether or not to permit the vehicle to enter the parking lot, and then refer to the previously stored history of the user s parking position and control the display 600 to display a parking stall in the user s favor.

In addition, notification generators 700 for imparting a data communication state between the parking management server 500 and the mobile communication terminal 400 may be further installed near the parking-position check RFID tags 300. The notification generators 700 may be implemented by lamps or speakers to visually or auditorily impart the data communication state to users.

Here, when the phone number and the read position information regarding the parking lot are received normally from the mobile communication terminal 400, the parking management server 500 may control the notification generator 700 installed at the corresponding parking stall to operate.

In addition, a parking-position notification device 800 for interworking with the parking management server 500 and imparting the position information regarding the current parking stall for the user s vehicle, may be further installed at the entrance/exit of the parking lot.

The parking-position notification device 800 further includes a predetermined RFID tag 810 to communicate with the RFID reader chip 450 of the mobile communication terminal 400. Thus, the mobile communication terminal 400 reads tag information stored in the RFID tag 810 and transmits its own phone number together with the read tag information to the parking management server 500. The parking management server 500 is provided with the phone number and the read tag information from the mobile communication terminal 400, and transfers the position information data of the current parking stall for the user s vehicle, corresponding to the phone number, to the parking-position notification device 800. Consequently, the user can easily and accurately know the parking position of his/her vehicle due to the parking-position notification device 800.

In addition, the parking-position notification device 800 may further include a key input unit 830 having a plurality of character and numeric keys. The parking-position notification device 800 transfers a key input signal received from the key input unit 830 to the parking management server 500. Then, the parking management server 500 refers to the database DB for the position information regarding the current parking stall for the user s vehicle corresponding to the key input signal, and transfers it to the parking-position notification device 800. Consequently, the user can easily and accurately know the parking position of his/her vehicle due to the parking-position notification device 800.

Meanwhile, the above-described parking-position notification device 800 may be implemented by one of an LED panel, an LCD, a PDP, and a speaker.

Furthermore, although not shown in the drawings, when the system for checking a parking position according to an exemplary embodiment of the present invention is applied to a department store, a discount department store, and so on, the parking management server 500 may interwork with an existing system for managing overall shopping information regarding customers, i.e., a legacy system, etc., and display on the display 600 an available parking position that is closest to a shop floor suitable for a customer s preference, on the basis of the shopping information regarding the customer.

Figure 5:
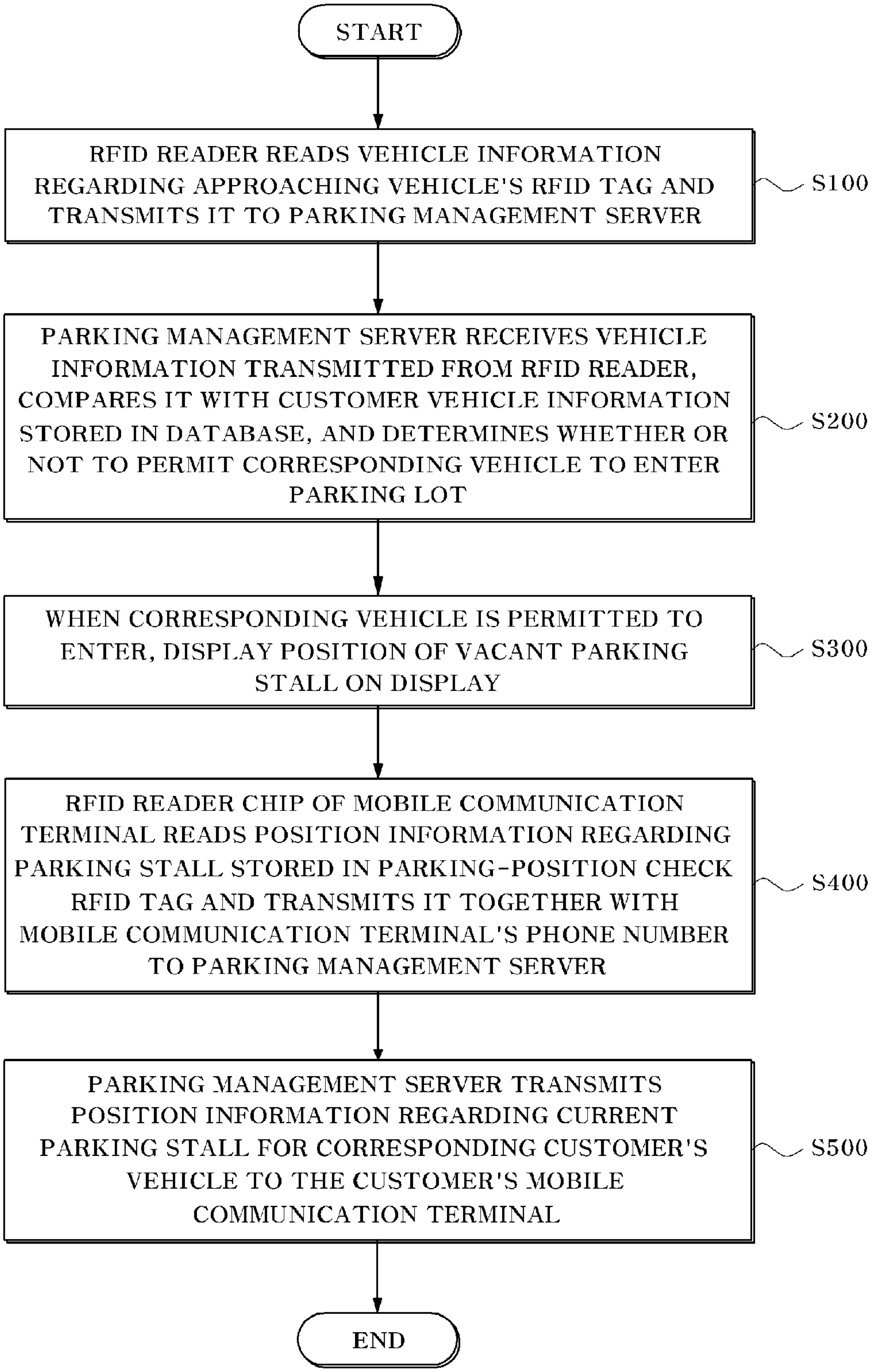
FIG. 5 is a flowchart showing a method of checking a parking position according to an exemplary embodiment of the present invention.

FIG. 5 is a flowchart showing a method of checking a parking position according to an exemplary embodiment of the present invention.

Referring to FIGS. 1 and 5, first, when a vehicle, to which the vehicle RFID tag 100 storing a variety of vehicle information provided by a customer using a parking lot and previously issued to the customer by a parking lot manager according to the request of the customer is attached, approaches the entrance of the parking lot, the RFID reader 200 reads and transfers the vehicle information regarding the approaching vehicle RFID tag 100 to the parking management server 500 (step 100).

Subsequently, the parking management server 500 is provided with the vehicle information from the RFID reader 200, compares it with customer vehicle information previously stored in the database DB, and determines whether or not to permit the vehicle to enter the parking lot (step 200).

When it is determined in step 200 to permit the vehicle to enter the parking lot, the parking management server 500 analyzes a current parking situation and displays the positions of vacant parking stalls on the display 600 disposed at the parking lot entrance (step 300).

Here, the parking management server 500 may refer to the history of the customer s parking position stored in the database DB and display on the display 600 the position of a parking stall suitable for the customer s preference.

Subsequently, when the customer parks his/her vehicle at the position of a vacant parking stall displayed on the display 600 and draws his/her mobile communication terminal 400 near the parking-position check RFID tag 300, the mobile communication terminal 400 reads the position information regarding the parking stall stored in the parking-position check RFID tag 300 using the built-in RFID reader chip 450 and transmits it together with the phone number thereof to the parking management server 500 (step 400).

Here, when data communication is performed normally between the parking management server 500 and the mobile communication terminal 400, the parking management server 500 may operate the notification generator 700 installed near the parking-position check RFID tag 300 to impart the position of the parking stall to the customer.

Finally, the parking management server 500 transmits the position information regarding the current parking stall for the customer s vehicle to the customer s mobile communication terminal 400 in text or graphic data (step 500).

Here, the parking management server 500 may match the phone number and the position information regarding the parking stall transmitted from the mobile communication terminal 400 with the vehicle information regarding the customer, corresponding to the phone number, and store and manage them.

Meanwhile, the method of checking a parking position according to an exemplary embodiment of the present invention can be stored on a computer-readable recording medium in the form of a computer-readable code. The computer-readable recording medium may be any recording device storing data that can be read by computer systems.

For example, the computer-readable recording medium may be a read-only memory (ROM), a random-access memory (RAM), a compact disk read-only memory (CD-ROM), a magnetic tape, a hard disk, a floppy disk, a mobile storage device, a non-volatile memory such as flash memory, an optical data storage device, and so on. Also, the recording medium may be carrier waves, e.g., transmission over the Internet.

In addition, the computer-readable recording medium may be distributed among computer systems connected via a communication network and stored and executed as a code that can be read by a de-centralized method.

As described above, according to the present invention, when a customer with a mobile communication terminal having a built-in RFID reader chip moves his/her vehicle close to an RFID tag for checking a parking position installed near the vehicle parking stall, the position information regarding the parking stall stored in the RFID tag for checking a parking position is transmitted to a parking management server, and the parking management server transmits it again to the mobile communication terminal in text or graphic format. Therefore, the customer can easily know the parking position of his/her own vehicle using his/her mobile communication terminal at any time. In addition, the parking management server checks the vacancy rate of the parking lot, thereby imparting information regarding the number of currently parked vehicles and available parking stalls on each floor to a vehicle entering the parking lot, and also letting the vehicle move to a currently available parking stall.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A system for checking a parking position, comprising:

a first Radio Frequency IDentification (RFID) tag attached to one side of a vehicle and storing vehicle information;

an REID reader installed at an entrance of a parking lot and having an antenna to read the vehicle information stored in the first RFID tag;

second RFID tags attached close to parking stalls to respectively correspond to the parking stalls, and storing position information regarding the corresponding parking stalls;

a mobile communication terminal having an RFID reader chip to read position information regarding a parking stall stored in a second RFID tag and transmitting the mobile communication terminal's phone number and the read position information regarding the parking stall to a parking management server via a wireless network; and the parking management server receiving the read vehicle information from the RFID reader, comparing it with previously stored customer vehicle information, determining whether or not to permit the vehicle to enter the parking lot, receiving the phone number and the read position information regarding the parking stall from the mobile communication terminal, matching them with the vehicle information regarding a customer corresponding to the phone number, storing and managing the matched phone number and the matched position information, and transmitting the position information regarding the current parking stall for the customer's vehicle to the customer's mobile communication terminal via the wireless network.

2. The system according to claim 1, wherein the parking management server transmits the position information regarding the current parking stall to the customer's mobile communication terminal in text or graphic data.

3. The system according to claim 1, further comprising:

a display installed at the entrance of the parking lot and visually displaying whether or not a vehicle exists in each parking stall managed by the parking management server.

4. The system according to claim 3, wherein the parking management server receives the read vehicle information from the RFID reader, compares it with the previously stored customer vehicle information, determines whether or not to permit the vehicle to enter the parking lot, and then, when the vehicle is permitted to enter the parking lot, refers to a previously stored history of the customer's parking position, and controls the display to display a parking stall suitable for the custumer's preference.

5. The system according to claim 1, further comprising:

notification generators respectively installed close to the second RFD tags and imparting a data communication state between the parking management server and the mobile communication terminal, wherein when the phone number and the read position information regarding the parking stall are received from the mobile communication terminal, the parking management server controls a notification generator installed at the parking stall to operate.

6. The system according to claim 5, wherein the notification generators are implemented by lamps or speakers to visually or auditorily impart position information regarding corresponding parking stalls to customers.

7. The system according to claim 1, further comprising:

a parking-position notification device interworking with the parking management server, installed at the entrance of the parking lot, and imparting the position information regarding the current parking stall for the customer's vehicle according to the customer's request.

8. The system according to claim 7, wherein the parking-position notification device is implemented by one of a light emitting diode (LED) panel, a liquid crystal display (LCD), a plasma display panel (PDP), and a speaker to visually or auditorily impart the position information regarding the current parking stall to the customer.

9. The system according to claim 7, wherein the parking-position notification device further comprises a third RFID tag to communicate with the RFID reader chip in the mobile communication terminal, the mobile communication terminal reads tag information stored in the third tag and transmits it together with the mobile communication terminal's phone number to the parking management server via the wireless network, and the parking management server receives the phone number and the read tag information from the mobile communication terminal and transmits the position information regarding the current parking stall for the vehicle of the customer, corresponding to the phone number, to the parking-position notification device.

10. The system according to claim 7, wherein the parking-position notification device further comprises a key input unit having a plurality of character and numeric keys and transmits a key input signal received from the key input unit to the parking management server, and the parking management server transmits the position information regarding the current parking stall for the vehicle of the customer corresponding to the key input signal to the parking-position notification device.

11. A method of checking a parking position using a system comprising a first Radio Frequency Identification (RFID) tag attached to one side of a vehicle and storing vehicle information, an RFID reader installed at an entrance of a parking lot, second RFID tags storing position information regarding each parking stall, a mobile communication terminal having a built-in RFID reader chip, and a parking management server managing overall parking situations in the parking lot, the method comprising the steps of:

(a) reading, at the RFID reader, the vehicle information regarding the first RFID tag drawn close to the RFID reader, and transmitting it to the parking management server;

(b) receiving, at the parking management server, the vehicle information from the RFID reader, comparing it with previously stored customer vehicle information, and determining whether or not to permit the vehicle to enter the parking lot;

(c) reading, at the RFID reader chip of the mobile communication terminal, position information regarding a parking stall stored in a second RFID tag and transmitting it together with the mobile communication terminal's phone number to the parking management server; and (d) transmitting, at the parking management server, the position information regarding the current parking stall for the vehicle of a corresponding customer to the customer's mobile communication terminal.

12. The method according to claim 11, after step (b), further comprising the step of:

when the vehicle is permitted to enter the parking lot, referring, at the parking management server, to a previously stored history of the customer's parking position, and displaying a position of a parking stall suitable for the customer's preference on a display disposed at the entrance of the parking lot.

13. The method according to claim 11, wherein in step (c), when data communication is performed normally between the parking management server and the mobile communication terminal, the parking management server operates a notification generator installed close to the second RFID tag to impart the position information regarding the parking stall to the customer.

14. The method according to claim 11, wherein step (d) further comprises the step of:

matching, at the parking management server, the phone number and the position information regarding the parking stall transmitted from the mobile communication terminal with the vehicle information regarding the customer, corresponding to the phone number, and storing and managing the matched phone number and the matched position information.

15. The method according to claim 11, wherein in step (d), the parking management server transmits the position information regarding the current parking stall to the customer's mobile communication terminal in text or graphic data.

16. A non-transitory computer-readable recording media storing a computer program which when executed cause a processor to perform the method according to claim 11.

17. The computer-readable recording media according to claim 16 storing a computer program capable of implementing the method according to claim 12.

18. The computer-readable recording media according to claim 16 storing a computer program capable of implementing the method according to claim 13.

19. The computer-readable recording media according to claim 16 storing a computer program capable of implementing the method according to claim 14.

20. The computer-readable recording media according to claim 16 storing a computer program capable of implementing the method according to claim 15.

* * * * *

UNITED STATES PATENT AND TRADEMARK OFFICE

CERTIFICATE OF CORRECTION

PATENT NO. : 8,334,792 B2
APPLICATION NO. : 12/514713
DATED : December 18, 2012
INVENTOR(S) : Tae Ho Kim It is certified that error appears in the above-identified patent and that said Letters Patent is hereby corrected as shown below:

Column 9, Line 31, Claim 1, delete “REID” and insert -- RFID --

Column 10, Line 9, Claim 4, delete “custumer’s” and insert -- customer’s --

Column 10, Line 12, Claim 5, delete “RFD” and insert -- RFID --

Signed and Sealed this
Nineteenth Day of February, 2013

Teresa Stanek Rea
*Acting Director of the United States Patent and Trademark Office*